United States Patent [19]
Goldstein

[11] Patent Number: 5,543,790
[45] Date of Patent: *Aug. 6, 1996

[54] KEYBOARD

[75] Inventor: Mark Goldstein, Darling Point, Australia

[73] Assignee: Goldstein Technology PTY Limited, New South Wales, Australia

[*] Notice: The term of this patent shall not extend beyond the expiration date of Pat. No. 5,424,728.

[21] Appl. No.: 434,109

[22] Filed: May 3, 1995

Related U.S. Application Data

[63] Continuation of Ser. No. 478, filed as PCT/AU91/00301, Jul. 8, 1991, Pat. No. 5,424,728.

[30] Foreign Application Priority Data

Jul. 10, 1990 [AU] Australia ............................. PK1123
Jul. 8, 1991 [WO] WIPO ................... PCT/AU91/00301

[51] Int. Cl.⁶ ................................................. H03K 17/94
[52] U.S. Cl. .......................... 341/22; 341/20; 345/168; 400/472; 400/489
[58] Field of Search ..................... 341/20, 22; 345/168, 345/169; 400/82, 472, 488, 489

[56] References Cited

U.S. PATENT DOCUMENTS

| | | | |
|---|---|---|---|
| D. 323,816 | 2/1992 | Buchin | D14/100 |
| D. 323,817 | 2/1992 | Buchin | D14/100 |
| 1,089,689 | 3/1914 | Burboa | |
| 3,940,758 | 2/1976 | Margolin | 345/169 |
| 3,990,565 | 11/1976 | Felton et al. | |
| 4,378,553 | 3/1983 | McCall | 400/82 |
| 4,483,634 | 11/1984 | Frey et al. | 400/489 |
| 4,509,873 | 4/1985 | Ryan | 400/489 |
| 4,597,681 | 7/1986 | Hodges | 341/22 |
| 4,613,247 | 9/1986 | McGunnigle | 400/486 |
| 4,661,005 | 4/1987 | Lahr | 400/489 |
| 4,824,268 | 4/1989 | Diernisse | 400/489 |
| 5,056,743 | 10/1991 | Zwar et al. | 400/715 |
| 5,067,834 | 11/1991 | Szmanda et al. | 400/82 |
| 5,073,050 | 12/1991 | Andrews | 400/82 |
| 5,120,117 | 6/1992 | Williams | 312/208 |
| 5,122,786 | 6/1992 | Rader | 341/22 |
| 5,135,190 | 8/1992 | Wilson | 400/715 |
| 5,137,384 | 8/1992 | Spencer et al. | 400/489 |
| 5,143,341 | 9/1992 | Juster | 248/444 |
| 5,160,919 | 11/1992 | Mohler et al. | 341/22 |
| 5,178,477 | 1/1993 | Gambaro | 400/489 |
| 5,214,428 | 5/1993 | Allen | 341/20 |
| 5,273,250 | 12/1993 | Pemberton et al. | 248/918 |
| 5,424,728 | 6/1995 | Goldstein | 341/22 |

FOREIGN PATENT DOCUMENTS

| | | |
|---|---|---|
| 361533A2 | 10/1989 | European Pat. Off. |
| 3413308 | 4/1984 | Germany |
| 3436189 | 10/1984 | Germany |
| 61-208113 | 9/1986 | Japan |
| 3-17723 | 1/1991 | Japan |
| 2189195 | 10/1987 | United Kingdom |
| WO83/00308 | 2/1983 | WIPO |
| WO84/00518 | 2/1984 | WIPO |
| WO85/03035 | 7/1985 | WIPO |
| WO87/06883 | 11/1987 | WIPO |
| PCT/AU88/00349 | 3/1989 | WIPO |
| WO91/03012 | 3/1991 | WIPO |
| WO93/01054 | 1/1993 | WIPO |

Primary Examiner—John K. Peng
Assistant Examiner—Daniel J. Wu
Attorney, Agent, or Firm—Kenyon & Kenyon

[57] ABSTRACT

The invention relates to a keyboard (1) to be used, for example, at a computer terminal. The preferred embodiment comprises a keyboard (1) having mounted thereon a number of keys (5), the keyboard being formed in at least two segments (2,3) which are mutually detachable and/or pivotable and wherein each of the segments (2,3) of the keyboard (1) has mounted thereon some of the keys (5). The pivoting/detachable nature of the keyboard aims at reducing stress and discomfort to the user by eliminating contortion to the operators wrists. More particularly, discomfort to the user caused by pronation of the wrists and/or supination of the wrists is reduced.

13 Claims, 2 Drawing Sheets

KEYBOARD

This application is a continuation under 35 U.S.C. § 120 and 37 C.F.R. §1.60 of application Ser. No. 08/000,478, filed Jan. 5, 1993, U.S. Pat. No. 5,424,728, which is the United States national phase of International Application Number PCT/AU91/00301 filed Jul. 8, 1991.

FIELD OF THE INVENTION

The following invention relates to keyboards, and more particularly through not exclusively to a keyboard formed in two or more mutually pivotable segments.

PRIOR ART

Known keyboards of the type used at a computer terminal for example, comprise a unitary board onto which a plurality of alpha numeric keys are attached. It is a disadvantage of such known keyboards that the wrists and/or arms and shoulders of an operator must be contorted into a configuration which is stressful to the user after prolonged use of the keyboard. This problem is brought about by the fact that the hands of the user must be turned outwardly by pivoting of the wrists relative to the forearms.

Discomfort to the user caused by pronation of the wrists is also a problem. It is desirable to reduce pronation and aim for supination of the wrists.

OBJECT OF THE INVENTION

It is the object of the present invention to overcome or substantially ameliorate the above disadvantages.

DISCLOSURE OF THE INVENTION

There is disclosed herein a keyboard having mounted thereon a plurality of keys, the keyboard comprising at least two segments which are mutually detachable and/or pivotable and wherein each segment of the keyboard has mounted thereon some of said keys.

Typically, the keyboard comprises two mutually pivotable segments which are attached to one another at a top end of the keyboard by way of a hinge means such that a bottom end of the keyboard may spread apart in a substantially horizontal plane.

Advantageously, the hinge means is adapted to allow pivoting in both horizontal and vertical planes such that said two segments of the keyboard may reside in different planes, such that the center of the keyboard is raised so as to reduce pronation and therefore decrease tension in the wrists and forearms of the user.

Generally, said hinge means is a ball and socket joint.

Advantageously, a support means is provided generally below the ball and socket joint so as to maintain the central region of the keyboard at a raised preselected level.

Beneficially, a number pad region of the keyboard is pivotable relative to one of said segments such that the number pad region may reside in a plane other than the plane of said segment to which said number pad is hinged.

Typically, the keyboard is divided into segments which coincide with generally accepted keyboard areas.

The present invention provides means by which wrists of an operator need not be contorted as they would be in use of a conventional keyboard.

In order to electrically connect the keys of one segment of the keyboard to the other, a cable or any suitable contact means may be provided between the two segments.

BRIEF DESCRIPTION OF THE DRAWINGS

A preferred form of the present invention will now be described by way of example with reference to the accompanying drawings, wherein.

DETAILED DESCRIPTION OF THE PREFERRED EMBODIMENT

Figure 1:
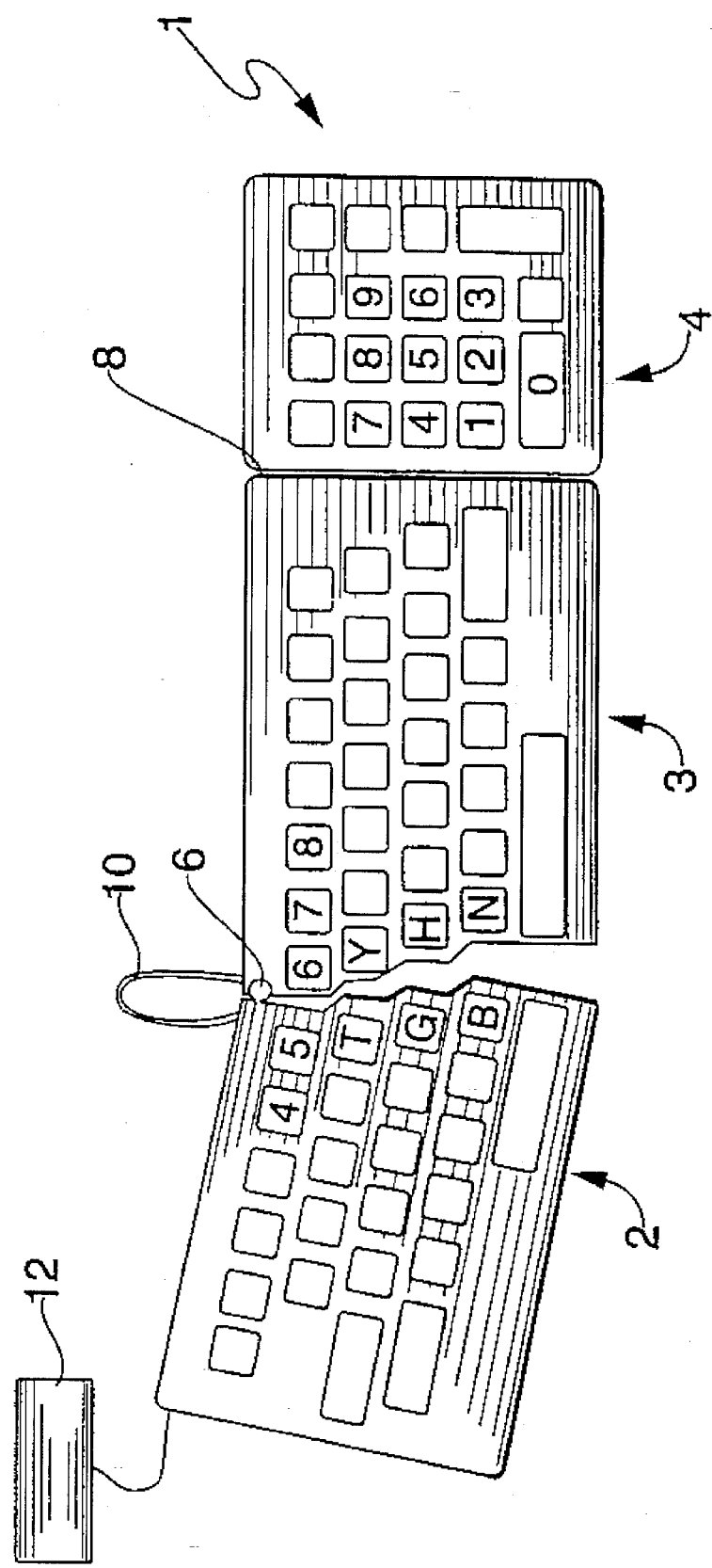
FIG. 1 is a schematic plan view of a keyboard.

The present invention relates to a keyboard 1 to be used, for example, at a computer terminal 12. In the accompanying drawings there is schematically depicted a keyboard generally indicated by reference numeral 1. Keyboard 1 comprises separate segments 2, 3, and 4 each having mounted thereto a plurality of keys 5.

Segments 2 and 3 of keyboard 1 are mutually attached by means of hinge 6 which may provide one or more degrees of freedom of relative movement between segments 2 and 3. Hinge 6 in the preferred embodiment is of ball and socket type construction.

Segment 4 of keyboard 1 which has mounted thereon numerical keys 5 is attached to segment 3 of hinge 7. Hinge 7 may extend along line 8 illustrated in FIG. 1 so as to provide 1 degree of relative movement between segments 3 and 4. Alternatively, a ball and socket type joint as employed between segments 2 and 3 may be located at either an upper or lower end of line 8 in FIG. 1.

Figure 2:
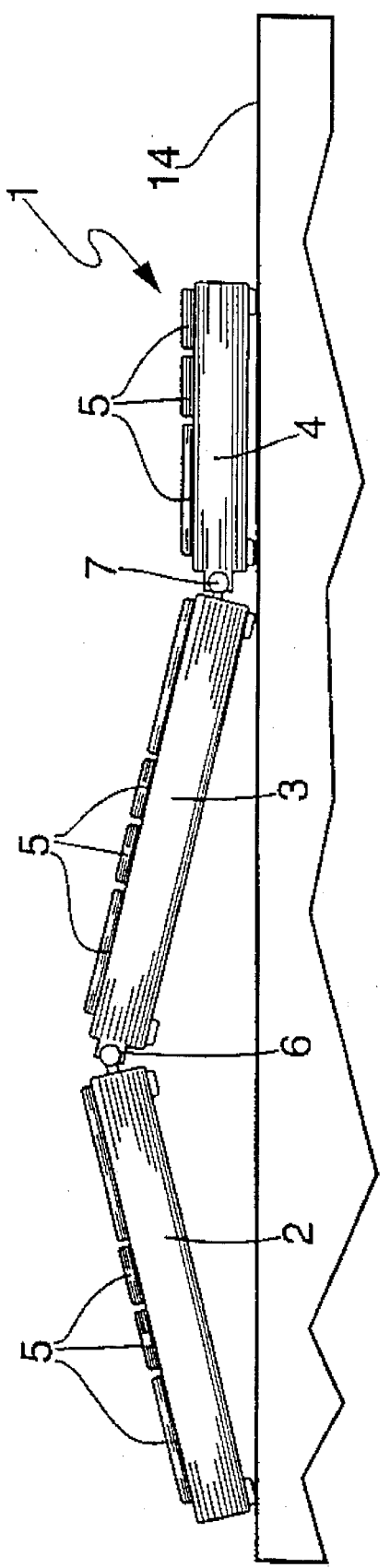
FIG. 2 is a schematic elevational view of the keyboard of FIG. 1.

It should be appreciated that segments 2 and 3 of keyboard 1 may pivot with respect to one another while each remaining in a single plane. As depicted in FIG. 2 however a center region of keyboard 1 is raised above the level of a desk 14 on which the keyboard is supported.

Segments 2, 3 and 4 of keyboard 1 may be completely detached form one another to provide an additional degree of freedom of relative positioning therebetween.

Should an operator of the keyboard not be comfortable with a hinged apart orientation of the keyboard, it may simply be returned to a conventional configuration.

In order to electrically connect the keys of one segment (e.g. segment 2) to the other (e.g. segment 3), a cable 10 or any suitable contact means may be provided between the two segments.

I claim:

1. A keyboard for use on a horizontal surface, comprising:
   a first keyboard segment including alphabetic keys located thereon;
   a second keyboard segment including alphabetic keys located thereon; and
   a ball-and-socket joint inter-coupling the first keyboard segment with the second keyboard segment, the ball-and-socket joint attached to a top right corner of the first keyboard segment and a top left corner of the second keyboard segment and adapted to allow pivoting of the first keyboard segment and the second keyboard segment in both horizontal and vertical direction;
   wherein, when the keyboard segments are adjusted to a non-coplanar configuration, the keyboard is maintained fixed in said non-coplanar configuration by the horizontal surface in cooperation with the ball-and-socket joint.

2. The keyboard of claim 1 further comprising a third segment coupled to the second keyboard segment, the third segment including numeric keys located thereon.

3. The keyboard of claim 2 wherein the third segment is coupled to the second keyboard segment by a second joint allowing the third segment to be positioned in a plane other than the plane of the second segment.

4. The keyboard of claim 3 wherein the second joint is a ball-and-socket joint.

5. The keyboard of claim 3 wherein the second joint is a hinge.

6. A keyboard for use on a horizontal surface, comprising:
- a first keyboard segment including alphabetic keys located thereon;
- a second keyboard segment including alphabetic keys located thereon; and
- hinging means inter-coupling the first keyboard segment with the second keyboard segment, the hinging means attached to a right corner of the first keyboard segment and a left corner of the second keyboard segment and adapted to permit angular adjustment of one keyboard segment with respect to three mutually perpendicular axes associated with the other keyboard segment, wherein when the keyboard is adjusted such that a center region of the keyboard is raised to a raised position with respect to the horizontal surface, the keyboard is maintained fixed in said raised position with respect to the horizontal surface without an external frame providing support for maintaining said fixed raised position.

7. The keyboard of claim 6 wherein the hinging means is a ball-and-socket joint.

8. The keyboard of claim 6 further comprising a third segment coupled to the second keyboard segment, the third segment including numeric keys located thereon.

9. The keyboard of claim 6 wherein the first keyboard segment and the second keyboard segment are positionable to reduce pronation of a user's wrists.

10. The keyboard of claim 8 wherein the third segment is coupled to the second keyboard segment by a joint allowing the third segment to be positioned in a plane other than the plane of the second segment.

11. The keyboard of claim 10 wherein the joint is a ball-and-socket joint.

12. The keyboard of claim 10 wherein the joint is a hinge.

13. A keyboard for use on a horizontal surface, comprising:
- a first keyboard segment including alphabetic keys located thereon;
- a second keyboard segment including alphabetic keys located thereon;
- a joint inter-coupling the first keyboard segment with the second keyboard segment, the joint attached to a top right corner of the first keyboard segment and a top left corner of the second keyboard segment and adapted to allow pivoting of the first keyboard segment and the second keyboard segment in both horizontal and vertical direction; and
- a third segment coupled to the second keyboard segment, the third segment including numeric keys located thereon;
- wherein when the keyboard segments are adjusted to a non-coplanar configuration, the keyboard is maintained fixed in said non-coplanar configuration by the horizontal surface in cooperation with the joint.

* * * * *